(12) United States Patent
Chang et al.

(10) Patent No.: US 6,395,385 B1
(45) Date of Patent: May 28, 2002

(54) LAMINATES PREPARED WITH REACTIVE HOT MELT ADHESIVE

(75) Inventors: Chung-Ying Chang; Gary J. Walsworth, both of Dublin, OH (US)

(73) Assignee: Ashland Inc, Dublin, OH (US)

( * ) Notice: Subject to any disclaimer, the term of this patent is extended or adjusted under 35 U.S.C. 154(b) by 0 days.

(21) Appl. No.: 09/865,868

(22) Filed: May 25, 2001

Related U.S. Application Data

(62) Division of application No. 09/257,827, filed on Feb. 25, 1999, now Pat. No. 6,274,674.

(51) Int. Cl.[7] .......................... B32B 27/01; B32B 27/08; B32B 27/30; B32B 27/40
(52) U.S. Cl. ...................... 428/319.7; 428/309.9; 428/319.9; 428/421; 428/423.1; 428/463
(58) Field of Search ............................... 428/421, 423.1, 428/463, 309.9, 319.7, 319.9; 525/129

(56) References Cited

U.S. PATENT DOCUMENTS

| | | | |
|---|---|---|---|
| 3,630,826 A | * | 12/1971 | Rose et al. |
| 3,875,090 A | * | 4/1975 | Levy |
| 5,527,616 A | * | 6/1996 | Hatano et al. ........... 428/423.1 |
| 6,020,429 A | * | 2/2000 | Yang et al. ............... 525/92 C |

* cited by examiner

*Primary Examiner*—Ana Woodward
(74) *Attorney, Agent, or Firm*—Martin Connaughton

(57) ABSTRACT

The present invention relates to laminates prepared using reactive hot melt adhesives. The reactive hot melt adhesives are the reaction product of a polyurethane prepolymer and a vinyl chloride based thermoplastic copolymer.

11 Claims, 1 Drawing Sheet

LAMINATES PREPARED WITH REACTIVE HOT MELT ADHESIVE

CROSS-REFERENCE TO RELATED APPLICATIONS

This is a division of U.S. Ser. No. 09/257,827 filed Feb. 25, 1999, now U.S. Pat. No. 6,274,674.

STATEMENT REGARDING FEDERALLY SPONSORED RESEARCH OR DEVELOPMENT

Not applicable.

BACKGROUND OF THE INVENTION

The present invention relates to solvent free, moisture-curable, reactive hot melt adhesive compositions that are solid at room temperature, a method of making the adhesive compositions, a laminate prepared from the adhesive compositions and a method of preparing the laminates. More particularly the invention relates to solvent free, moisture-curable, hot melt adhesive compositions comprising a polyurethane prepolymer and a vinyl chloride based thermoplastic copolymer.

Moisture curable reactive hot melt adhesives are known. Typically, these reactive hot melt adhesives are 100% solids materials which do not contain or require solvents. They are solids at room temperature and liquids when heated to application temperatures. The adhesives are used to prepare laminated structures such as garage doors, architectural panels, truck doors, patio enclosure panels, transit panels, cold storage panels, agricultural panels and the like. The materials used for the panel portion of the laminates include coated and uncoated metals, treated and untreated plastics, fiber reinforced plastics (FRP), vinyl, plywood, particleboard, oriented strandboard (OSB) and foam. The adhesive is required to provide structural performance with high moisture resistance and high bond strength. In general, the adhesive is applied in a molten state as a single component with a roller, spraying, etc.

Both batch and continuous processes can be used to prepare a laminate. In a batch process a stack of adhesive coated panels is assembled. The stack is placed in a press and pressure is applied. The pressure of the press on the stack is not released until adhesive strength has developed which is sufficient to bond all the layers of the laminate tightly together. In a continuous process the adhesive coated panel laminate is continuously passed through a nip roller or other device for applying pressure. In the continuous process the adhesive needs to provide immediate adhesive strength (green strength) after rolling or pressing in order to insure that the various layers of the laminate remain bonded until the adhesive is allowed to continue to cure. Reactive hot melt adhesives having quick green strength are particularly suitable for a continuous process.

A number of reactive hot melt polyurethane adhesive compositions are known. U.S. Pat. No. 3,931077 discloses a composition comprising, a polyurethane prepolymer having a viscosity greater than 300,000 cps at 25° C.; a thermoplastic resin of an ethylene-vinylacetate copolymer; and a tackifier. U.S. Pat. No. 4,585,819 teaches the combination of a polyurethane prepolymer, a thermoplastic polyurethane or polyester, and a synthetic resin selected from the group consisting of ketone resins, hydrogenated products of acetophenone condensation resins and mixtures thereof. U.S. Pat. No. 4,775,719 discloses compositions comprising; a prepolymer having a viscosity of less than 300,000 cps at 25° C., a thermoplastic ethylene-vinylacetate copolymer or ethylene acrylate copolymer, a tackifier and an antioxidant. These compositions are prepared by blending a polyurethane prepolymer with a melted mixture of a thermoplastic polymer and a tackifier at 150° C. U.S. Pat. No. 4,808,255 teaches that compatible blends may be prepared by combining a polyurethane prepolymer made by reacting an isocyanate compound with a polyester polyol, a thermoplastic ethylene-vinyl monomer copolymer and tackifying agent at elevated temperatures sufficient to melt the composition but not harm the components. U.S. Pat. No. 5,021,507 discloses thermoplastic acrylic modified reactive urethane hot melt adhesive compositions in which the acrylic component is prepared by polymerizing acrylic monomers in the presence of polyols. An isocyanate is then added to react with the polyol in situ. U.S. Pat. No. 5,527,616 relates to specific uses of hot melt adhesives. It discloses a laminate for flexible packaging using a polyurethane reactive hot melt adhesive. The polyurethane prepolymer contains a polyester polyol component having 3 to 50 mole % of an aromatic component selected from the group consisting of an aromatic diol and an aromatic dicarboxylic acid. Use of the aromatic component is said to markedly improve adhesion to different polyester films. The patent discloses that from 0 to 10 parts by weight of a thermoplastic copolymer may be blended into the composition. U.S. Pat. No. 5,550,191 discloses a catalyzed polyurethane reactive hot melt comprising; a reactive polyurethane adhesive and from 0.05 to 0.15 wt % 2,2'dimorpholinoethyl ether catalyst. This reference discloses a method of improving the cure speed of the composition by including a thermoplastic ABA block, A-(BA)n-B block or radial A-B-A block; where A=polystyrene, B=a rubbery block and n=2-50. U.S. Pat. No. 5,827,926 moisture-curable hot melt compositions comprising a polyurethane prepolymer and a crystalline polymer. The crystalline polymer must contain at least one crystalline monomer. The claimed crystalline monomers are (meth)acrylate esters of non-tertiary alcohols where the alkyl portion is comprised of 16 or more carbons containing no isocyanate reactive hydrogen.

Other references disclose adhesive compositions containing a mixture of a polyurethane prepolymer and a chlorinated resin. Typically, these compositions are dissolved in solvents. They are not reactive hot melts. U.S. Pat. No. 4,217,254 and U.S. Pat. No. 4,340,682 disclose adhesive compositions in solvents consisting essentially of a recinoleate polyurethane prepolymer and a chlorinated rubber or a chlorinated polyvinyl chloride resin. U.S. Pat. No. 4,740,424 discloses compositions containing a polyurethane prepolymer and a halogenated resin compatible with the prepolymer. Polyols used to prepare the prepolymer are selected from the group consisting of polytetramethylene oxide polyols, polycarbonate polyols, and polysulfide polythiols. The halogenated resins contain from 50 to 70 weight percent halogen.

BRIEF SUMMARY OF THE INVENTION

The present invention relates to solvent free, moisture-curable, reactive hot melt adhesive compositions that are solids at room temperature, methods of preparing the compositions, methods of preparing laminates using the compositions of the invention and laminates prepared using the adhesive compositions. The compositions are comprised of an isocyanate terminated prepolymer and a thermoplastic copolymer which is compatible with the isocyanate prepolymer. The isocyanate prepolymer is the reaction product of an aliphatic polyester polyol or mixture of aliphatic polyester polyols and a polyisocyanate or mixture of polyisocyanates. The thermoplastic copolymer is prepared from vinyl chloride monomers and at least one other monomer capable of copolymerizing with the vinyl chloride. The vinyl chloride monomers make up at least 50% by weight of the thermoplastic copolymer.

The thermoplastic copolymer is free of isocyanate reactive groups and has a weight average molecular weight ($M_w$) greater than about 30,000. The vinyl chloride based thermoplastic used in the present invention can decompose releasing hydrogen chloride, during processing and weathering. In order to ensure the effectiveness of the present hot melt compositions a stabilizer can be added. The stabilizer acts as an acid scavenger. Epoxy containing compositions are generally suitable as stabilizers in the compositions of the present invention. Examples of such compositions include epoxidized oils and resins. Many of these compositions also act as plasticizers. In addition, the composition may also contain components typically found in solvent free, moisture-curable, hot melt adhesives such as; catalysts, fillers, antioxidants, adhesion promoters, tackifiers, plasticizers, waxes and the like. The solvent free, moisture-curable, hot melt adhesive compositions of the present invention may be prepared by conventional means, however the compositions of the present invention can also be prepared by a one-step, in-situ process which can be run at moderate temperatures. The use of moderate processing temperatures aids in maintaining the integrity of the adhesive components. One object of the invention is to provide solvent free, moisture-curable, hot melt adhesive compositions which exhibit shear thinning rheological behavior, improved green strength, water resistance, and adhesion to various substrates such as metals, wood, plastics, and foams. Another object of the invention is to provide a simple one step method of preparing the adhesive compositions of the invention. Other objects of the invention include laminates prepared using the claimed adhesive compositions and method of preparing the laminates using the claimed adhesive compositions.

DETAILED DESCRIPTION OF THE INVENTION

Figure 1:
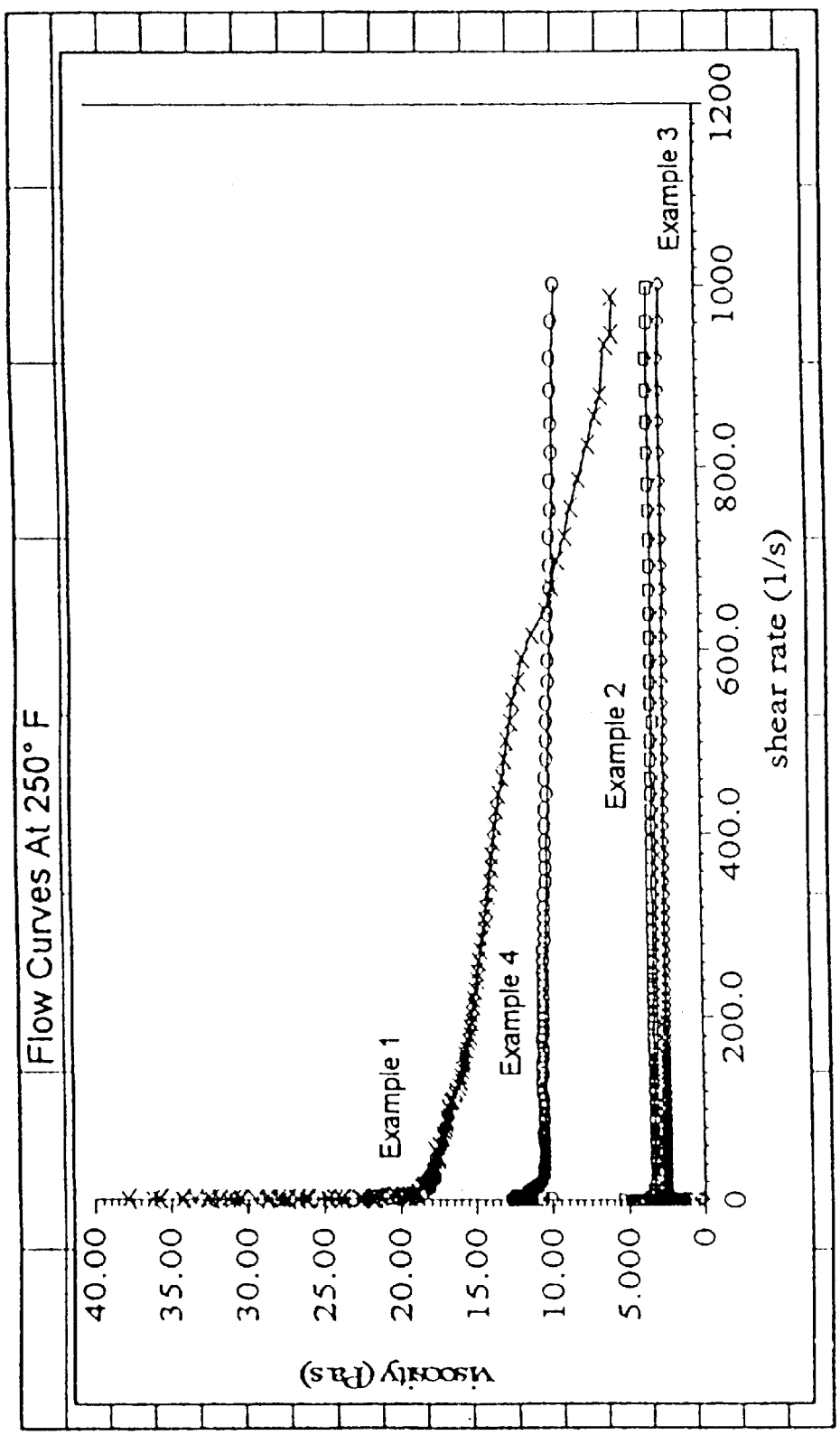
FIG. 1 - viscosity curves for examples 1, 2, 3, and 4.

The present invention relates to solvent free, moisture-curable, reactive hot melt adhesive compositions, methods of making the compositions and the use of the compositions in the preparation of laminates. It has been found that solvent free, homogeneous, moisture-curable, reactive hot melt compositions can be prepared from mixtures of an isocyanate terminated prepolymer and a vinyl chloride copolymer. The compositions are easily made by a one step in-situ process and exhibit excellent physical characteristics, such as shear thinning rheological behavior, improved green strength, water resistance, and adhesion to a variety of substrates. Other additives commonly added to the moisture-curable reactive hot melt adhesive. compositions include catalysts, fillers, antioxidants, adhesion promoters, tackifiers, plasticizers, stabilizers and waxes. These additives may be added to the extent they do not adversely effect the basic characteristics of the compositions of the present invention. The preparation of isocyanate terminated prepolymers is well known in the art. Typically, the isocyanate terminated prepolymer is prepared by the reaction of a polyisocyanate with a polyol. The isocyanate terminated prepolymer of the present invention is prepared by reacting an excess of a polyisocyanate with an aliphatic polyester polyol. The polyisocyanate excess should be such that the isocyanate index of the prepolymer is greater than about 2.0. Preferably the isocyanate index is about 3.0. The isocyanate index is the ratio of isocyanate groups to isocyanate reactive groups. For purposes of the present invention the term polyisocyanate includes isocyanate compositions with two or more isocyanate groups per molecule. Examples of polyisocyanates useful in the present invention include diphenylmethane-2,4'-diisocyanate, diphenylmethane-4,4'-diisocyanate, tolylene-2,6-diisocyanate, naphthalene-1,5-diisocyanate, triphenylmethane-4,4',4"-trisocyanate, 1,4-phenylene diisocyanate, 4,4'-cyclohexylmethane diisocyanate, hexamethylene diisocyanate, isophorone diisocyanate, tetramethylxylene diisocyanate, xylene diisocyanate and the like. A single polyisocyanate or mixture of polyisocyanates may be used. The average functionality of the polyisocyanate or mixture of polyisocyanates used in the preparation of the prepolymer should be between 2.0 and 2.3. Preferably, the average functionality is between 2.0 and 2.1.

Examples of aliphatic polyester polyols include polyesterpolyols obtained by ring opening polymerization of a lactone such as e-caprolactone and polyester polyols derived from polyhydric alcohols and polybasic acids. A mixture of aliphatic polyester polyols containing at least one crystallizing aliphatic polyester diol having a melting point of at least 40° C. is preferred. Examples of polyhydric alcohols which may be used in the reaction with polybasic acids includes, ethylene glycol, 1,2-propylene glycol, 1,3-propylene glycol, 1,3-butylene glycol, 1,4-butylene glycol, neopentyl glycol, 1,6-hexanediol, 1,8-octanediol, 1,10-decanediol, 1,12-dodecanediol, diethylene glycol, dipropylene glycol, cyclohexane-1,4-diol, glycerol, trimethylol propane, etc. Examples of polybasic acids includes, succinic acid, glutaric acid, adipic acid, pimelic acid, suberic acid, azelaic acid, sebacic acid, undecanedionic acid, dodecandioic acid, etc.

Up to about 30% by weight of a polyether polyol or mixture of polyether polyols based on the total weight of all polyols may be used in the preparation of the prepolymer. However, if amounts greater than about 30% by weight are used the thermoplastic vinyl chloride copolymer will not be miscible in the polyol. Consequently, the mixture of the prepolymer and the thermoplastic vinyl chloride copolymer would not be homogeneous. The isocyanate prepolymer is present in the reactive hot melt adhesive composition in an amount of from 60% to 95% by weight based on the total weight of the adhesive composition.

The polyether polyols useful in the present invention are well known to those skilled in the art. These polyols are obtained by copolymerizing at least one compound of ethylene oxide, propylene oxide, butylene oxide, tetrahydrofuran, etc. with at least one compound having at least two active hydrogen atoms on average in one molecule such as the polyhydric alcohols list above which include ethylene glycol, propylene glycol, dipropylene glycol, glycerol and the like. Other suitable polyhydric compounds include sucrose, ethylenediamine, propylenediamine, triethanolamine, 1,2-propanedithiol, etc. The thermoplastic copolymer of the present invention is prepared from vinyl chloride monomers and at least one other monomer capable of copolymerizing with vinyl chloride. Preferably, the copolymer contains at least about 10% by weight of a monomer capable of copolymerizing with the vinyl chloride.

Vinyl chloride makes up at least 50% by weight of the thermoplastic copolymer. The copolymer is free of isocyanate reactive groups and has a weight average molecular weight ($M_w$) of greater than 30,000. Typically, the $M_w$ is from greater than about 30,000 to about 100,000. A most preferred $M_w$ is about 60,000. Examples of monomers copolymerizable with a vinyl chloride monomer include ethylene, propylene, butenes, pentene-1, butadienes, styrene, acrylonitrile, vinylidene chloride, vinylidene cyanide, alkyl vinyl ethers, vinyl carboxylate esters, allyl ethers, N-vinylpyrrolidone, vinyl silanes, esters of acrylic and methacrylic acid, or mixtures thereof. Especially preferred monomers include vinyl acetate, alkyl esters of methacrylic acid, vinylidene chloride, acrylonitrile, or mixtures thereof. Preferred esters of acrylic and methacrylic acid are those alkyl esters where the alkyl group has from 1 to 12 carbon atoms. An example of a preferred thermoplastic copolymer is a vinyl chloride-vinyl acetate copolymer having a weight average molecular weight of between 60,000 and 65,000. The thermoplastic copolymer preferably is present in the reactive hot melt adhesive composition in an amount of from 5% to 40% by weight based on the total weight of the adhesive composition. Vinyl chloride copolymers in general are somewhat susceptible to degradation during processing and weathering. For instance, when a polyvinyl chloride copolymer is exposed to heat and light a non-chain scission reaction such as dehydrochlorination can occur. In order to alleviate the effects of this type of reaction a stabilizer is added to the reactive hot melt composition. The stabilizer acts as an acid scavenger and to some extent a plasticizer, in the reactive hot melt. Suitable stabilizers include epoxide group containing compositions. Examples of useful epoxide group containing compositions include epoxy resins, epoxidized soybean oil, epoxidized tall oil and epoxidized polybutadiene. These epoxide group containing compositions are present in the reactive hot melt adhesive compositions in amounts up to about 20% by weight based on the total weight of the adhesive composition. Preferably, the epoxide containing compositions are present in amounts of from 5% to 15% by weight based on the total weight of the composition. Other stabilizers although not preferred may be used. Examples of other stabilizers include metallic soaps such as lead, calcium, barium, zinc, or cadmium stearate.

Other commonly used additives may be added to the reactive hot melt adhesive compositions. Such common additives include catalysts, fillers, antioxidants, adhesion promoters, tackifiers and waxes.

Catalysts that may be employed are those conventionally used to promote the reaction of the isocyanate group with an active hydrogen. Examples include amine catalysts such as triethyl amine, triethylene diamine, N-methyl morpholine, 2,2'-dimorpholinoethyl ether, and di(2,6-dimethylmorpholinomethyl)ether; and tin catalysts such as tetramethyltin, tetraoctyltin, dimethyl dioctyltin, triethyltin dichloride, dibutyltin diacetate and dibutyltin dilaurate.

Fillers include for example carbon black, calcium carbonate, titanium dioxide, talc and precipitated and fumed silica.

Antioxidants include phenolic types such as, BHT (butylated hydroxytoluene), octadecyl-3,5-bis(1,1-dimethyl)-4-hydroxybenzene-propanoate, and pyrogallol; phosphites such as, triphenyl phosphite, tris(nonylphenyl) phosphite; or thioesters such as, dilauryl thiodipropionate. Adhesion promoters include, organosilanes such as, isocyanatopropyltriethoxysilane, gamma-mercaptopropyltrimethoxysilane, gamma-glycidoxypropyltrimethoxysilane, and tris(3-trimethoxysilyl)isocyanurate. Tackifiers can include rosin esters and terpene phenolic resins.

Waxes which can be included in the compositions of the present invention are generally defined as hydrocarbons or hydrocarbon derivatives which are solids at room temperature (77° F.), but are low viscosity liquids at moderately higher temperatures ( below 250° F.). An example of a typical wax is paraffin. The reactive hot melt adhesive compositions of the present composition may be prepared in any manner known in the art for preparing similar compositions. However, the compositions of the present invention are preferably prepared in a simple process where the polyester polyol, the thermoplastic vinyl chloride copolymer, the polyisocyanate and other additives are added to a single reaction vessel; the polyisocyanate and polyester prepolymer are allowed to react forming the prepolymer in-situ; and the resulting homogeneous mixture is discharged to a clean dry container. Those skilled in the art will understand that exact conditions for the preparation of the reactive hot melt adhesive compositions of the present invention will vary with the individual components. The following procedure provides a preferred method. Typically, a polyester polyol or mixture of polyester polyols is premelted at 100° C. to 130° C. The melted polyester polyol(s) and optional stabilizer are charged into a reaction vessel equipped with an anhydrous inert gas inlet, a means for agitating the contents of the vessel, an addition port, a vacuum source, a heat source and a discharge port. Solid, powdered vinyl chloride based copolymer is added to the melted polyester polyol mixture with sufficient agitation to wet the powder. The wetted powder is allowed to dissolve in the polyol and the molten mixture is dehydrated at 115° C. to 130° C. for from about 45 minutes to 60 minutes under a vacuum of about 25 mmHg. When the dehydration is complete, the mixture is allowed to cool under vacuum to 115° C. The vacuum is relieved with anhydrous, inert gas and polyisocyanate is added to the mixture under the inert gas with agitation. The temperature is raised to 120° C. to 130° C. under a vacuum about 25 mmHg and the polyisocyanate and polyester polyol are allowed to react. On completion of the reaction of the polyisocyanate and the polyol, the homogeneous melt can be discharged to a container under an anhydrous inert gas atmosphere. The storage containers should be air tight. Additives can be added at any appropriate time during the process. Preferably, the stabilizer is added prior to heating the thermoplastic vinyl chloride copolymer. The optional catalyst can be added to the molten homogeneous mixture before or after the reaction between the polyisocyanate and the polyester polyol is complete but before the mixture is completely cooled and discharged.

The reactive hot melt adhesive compositions have melt viscosities of up to 50,000 cps at 250° F. The reactive hot melt adhesive compositions of the invention exhibit shear thinning rheology which allows viscous molten adhesive compositions to be delivered and applied at reduced viscosities without raising process temperatures beyond common current temperatures of about 250° F.

Having thus described the invention the following examples are illustrative in nature and should not be construed as limiting.

In the examples all parts are by weight unless otherwise indicated. Melt viscosity is in centipoise and determined using a Brookfield Thermosel viscometer with a #27 spindle at 5 rpm. Following are descriptions of compositions used in the examples.

Tone 0240 is a poly (ε-caprolactone) polyol available from Union Carbide.

Dynacoll 7380 is a crystalline polyester available from Creanova.

Lexorez 1931-50 is a polyglycol adipate available from Inolex.

EPON 825 is a bisphenol A/epichlorohydrin based epoxy resin available from Shell.

CP 4915 is a vinyl chloride vinyl acetate copolymer available from Colorite Polymers.

ISONATE 2125M is a 4-4'-diphenylmentane diisocyanate (MDI) available from Dow.

FLEXOL PLASTICIZER EPO is a epoxidized soybean oil available from Union Carbide.

MONDUR ML is an isomer mixture of diphenylmentane diisocyanate (MDI) available from Bayer.

ELVACITE 2013 is an acrylic resin available from ICI.

EXAMPLE 1

37.11 g of Tone 0240, 6.00 g of Dynacoll 7380 available from Creanova, 5.00 g of Lexorez 1931-50 and 15.00 g of Epon 825 were premelted at 100° C. to 130° C. in an oven. The melted mixture was charged to a glass kettle fitted with an anhydrous nitrogen gas inlet adapter, a cover with rubber gasket, gas inlet, and stirrer. 20.00 g of CP 4915 powder was added to the melt with stirring and allowed to mix until the CP 4915 was thoroughly wetted. The contents of the vessel were stripped at 115° C. to 130° C. for about 45 minutes under a vacuum of about 25 mmHg. After 45 minutes the temperature was allowed to cool to about 115° C. while maintaining the vacuum. When the temperature of the molten mixture reached at 115° C., the vacuum was relieved with anhydrous nitrogen and 16.89 g of ISONATE 2125M were added with mixing. The temperature of the mixture was raised to 120° C. to 130° C. under a vacuum of about 25 mmHg and the mixture was allowed to react for about 45 to 60 minutes. The finished product was discharged to a clean, dry container under an anhydrous nitrogen blanket and sealed. The finished product was homogeneous and had an NCO Index of 3.0; an NCO content, % (calc.) 3.78; and a viscosity at 250° F. of 13,550.

EXAMPLE 2

The same procedure for preparing a reactive hot melt adhesive composition as that used in example 1 was followed except that the following components were used:

| Tone 0240 | 51.65 g |
|---|---|
| Dynacoll 7380 | 6.00 g |
| Lexorez 1931-50 | 5.00 g |
| Epon 825 | 15.00 g |
| ISONATE 2125M | 22.35 g |

The composition had an NCO Index of 3.0; an NCO content, % (calc.) of 5.00; and a viscosity at 250° F. of 2,670.

EXAMPLE 3

The same procedure for preparing a reactive hot melt adhesive composition as that used in Example 1 was followed except that the following components were used:

| Tone 0240 | 37.11 g |
|---|---|
| Dynacoll 7380 | 6.00 g |
| Lexorez 1931-50 | 5.00 g |
| Epon 825 | 15.00 g |
| Elvacite 2013 | 20.00 g |
| ISONATE 2125M | 16.89 g |

The composition appeared grainy indicating that it was not homogeneous. It had an NCO Index of 3.0; an NCO content, % (calc.) 3.78; and a viscosity at 250° C. of 1,490.

EXAMPLE 4

The composition was prepared according to the procedure used in Example 1 of U.S. Pat. No. 5,550,191. 16.89 g of Lexorez 1400-56, 39.37 g Poly-G 20-56 and 25.00 g of Elvacite 2013 were added to vessel and heated to 100° C. until the Elvacite dissolved. At that point 18.74 g of ISONATE 2125M was added and the reaction was held at 100° C. for 3 hours. The reaction mixture was decanted hot to a clean, dry container. The composition had an NCO Index of 1.57; an NCO content, % (calc.) 2.27; and a viscosity at 250° F. of 13,350.

EXAMPLE 5 (rheology)

The shear thinning behavior of adhesive examples 1, 2, 3 and 4 was examined. Each of the adhesive samples was subject to a shear sweep from 0 to 1,000 1/sec. at 250° F., using a Carrier Med CSL Rheometer (TA Instruments, Inc.). The viscosity curves for the 4 examples are given.

Example 1, which was a vinyl chloride copolymer-polyurethane adhesive according to the invention shows a much greater shear thinning behavior than examples 2-4, which exhibit little if any shear thinning rheology.

EXAMPLE 6 (Green Strength)

The green strength of examples 1–4 was compared by measuring the hold time of a laminate prepared from a vinyl sheet and expanded polystyrene. A thin film of molten adhesive (1.1 g±0.3) at about 250° F. was coated onto a 2.0 inch by 3.0 inch piece of expanded polystyrene foam. Light pressure (~0.5 psi) was applied to the laminate for 5 minutes. After 5 minutes firm hand pressure was used to mate the surfaces. Immediately, a 1,000 g weight was hung from the vinyl sheet and the timer started. Holding time was recorded as the point when the vinyl sheet completely separated from the foam. The results are given in the chart below.

| Example No. | Holding time (minutes) |
|---|---|
| 1 | 16.10 |
| 2 | 6.29 |
| 3 | 0.78 |
| 4 | 9.33 |

EXAMPLE 7 (Peel Strength)

Three samples were prepared according to the procedure of Example 1. The compositions used to prepare each of the three samples are listed in Table 1. The adhesive samples were then applied to substrates. In each case metal was bonded to the grade A side of plywood. Each laminate specimen was allowed to cure at room temperature and ambient humidity for seven days. Both water soak and hot peel tests were performed on each type of sample. For the water soak test samples were completely immersed in water at ambient temperatures. Each sample was the subject first to a vacuum of 25 mmHg or less for thirty minutes and then to pressure (~75 psi) for an additional thirty minutes. The pressure was relieved and each sample was tested wet.

For the hot peel test each sample was held in a hot air circulating oven at 160° F. for 16 to 24 hours. Samples were tested immediately after being removed from the oven. Results of the water soak peel test and the hot peel test are given in Tables 2 and 3.

TABLE 1

| ADHESIVE # COMPOSITION | CONTROL WEIGHT (%) | 1 WEIGHT (%) | 2 WEIGHT (%) |
|---|---|---|---|
| TONE 0240 | 78.41 | 56.06 | 56.06 |
| FLEXOL EPO | — | 10.00 | — |
| EPON 825 | — | — | 10.00 |
| CP 4915 | — | 15.00 | 15.00 |
| MONDUR ML | 21.59 | 18.93 | 18.93 |
| NCO INDEX | 2.20 | 2.70 | 2.70 |
| NCO Cont, % (calc) | 3.95 | 4.00 | 4.00 |
| Melt Visc. (cps) @ 250° F. | 1,000 | 4,450 | 7,350 |

TABLE 2

90° Wet Peel in Water Soak Test - ASTM D3167
Metal to Plywood (Douglas fir, A/C)

| | CONTROL | | 1 | | 2 | |
|---|---|---|---|---|---|---|
| ADHESIVE # Metals | Strength (pli) | Wood Failure (%) | Strength (pli) | Wood Failure (%) | Strength (pli) | Wood Failure (%) |
| Epoxy Backed Aluminum | 16 | 72 | NA | Wood Broke | 11 | 88 |
| Bare Aluminum | 16 | 60 | 9.9 | 52 | 12 | 80 |
| Mirror Stainless Steel | 11 | 75 | 9.4 | 88 | 12 | 58 |

Notes: Numbers shown are the average of 2 specimens (1 inch × 12 inches), crosshead speed 2.0"/min.

TABLE 3

90° Hot Peel at 160° F. Test - ASTM D 3167
Metal to Plywood (Douglas fir, A/C)

| | CONTROL | | 1 | | 2 | |
|---|---|---|---|---|---|---|
| ADHESIVE # Metals | Strength (pli) | Wood Failure (%) | Strength (pli) | Wood Failure (%) | Strength (pli) | Wood Failure (%) |
| Epoxy Backed Aluminum | 24 | 58 | NA | Wood Broke | 13 | 90 |
| Bare Aluminum | 13 | 0 | 10 | 100 | 11 | 96 |
| Mirror Stainless Steel | 19 | 80 | 16 | 96 | 12 | 85 |

Notes: Numbers shown are the average of 2 specimens (1 inch × 12 inches), crosshead speed 2.0"/min.

We claim:
1. A laminate, comprising;
   A) at least two substrate layers, and
   B) between said substrate layers an adhesive consisting essentially of a mixture of;
      i) an isocyanate terminated prepolymer with an isocyanate index greater than about 2, comprising the reaction product of an aliphatic polyester polyol or mixture of aliphatic polyester polyols and a polyisocyanate or mixture of polyisocyanates, and
      ii) a thermoplastic copolymer having a weight average molecular weight greater than 30,000 which is compatible with the isocyanate prepolymer, comprising the reaction product of vinyl chloride and at least one monomer capable of copolymerizing with vinyl chloride;
   where the thermoplastic copolymer contains at least 50% by weight vinyl chloride, at least 10% by weight of the monomer capable of copolymerizing with the vinyl chloride and is free of isocyanate reactive groups.

2. The laminate as claimed in claim 1 wherein the adhesive further consists essentially of; a thermoplastic copolymer stabilizer.

3. The composition as claimed in claim 2, where the stabilizer is an epoxidized soybean oil, epoxidized tall oil, epoxy resin, epoxidized polybutadiene or mixtures thereof.

4. The laminate as claimed in claim 1, wherein the thermoplastic copolymer is the reaction product of vinyl chloride and at least one monomer selected from the group consisting of; vinyl acetate, vinylidene chloride, esters of methacrylic acid, acrylonitrile.

5. The laminate as claimed in claim 1, wherein at least one aliphatic polyester polyol is a crystallizing aliphatic polyester diol having a melting point of at least 40° C.

6. The laminate as claimed in claim 1, wherein the thermoplastic copolymer is the reaction product of vinyl chloride and vinyl acetate.

7. The laminate as claimed in claim 1, wherein up to about 30% by weight of the polyester polyol is replaced with a polyether polyol or mixture of polyether polyols.

8. The laminate as claimed in claim 1, wherein the polyisocyanate is an aromatic polyisocyanate.

9. The laminate as claimed in claim 1 wherein the adhesive is reacted in the presence of a catalyst.

10. The laminate as claimed in claim 1, wherein the substrate layers are selected from the group consisting of; coated and uncoated metals, treated and untreated plastics, fiber reinforced plastics, vinyl, plywood, particle board, oriented strand-board and foam.

11. A laminate, comprising;
   A) at least two substrate layers, and
   B) between said substrate layers an adhesive consisting essentially of a mixture of;
      i) from 60% to 95% by weight of an isocyanate terminated prepolymer with an isocyanate index greater than about 2.0, comprising the reaction product of:
         a) a polyisocyanate or mixture of polyisocyanates having an average functionality of from 2.0 to about 2.3, and
         b) an aliphatic polyester polyol or mixture of aliphatic polyester polyols;
      ii) from 5% to 40% by weight of a thermoplastic copolymer that is compatible with the isocyanate prepolymer, having a weight average molecular weight greater than 30,000, comprising the reaction product of vinyl chloride and vinyl acetate where at least 50% by weight of the thermoplastic is vinyl chloride and at least 10% by weight of the thermoplastic copolymer is vinyl acetate;

iii) up to 20% by weight of a stabilizer selected from the group consisting of epoxidized soybean oil, epoxidized tall oil, epoxy resin, epoxidized polybutadiene and mixtures thereof;

iv) optionally a catalyst,
v) optionally a filler,
vi) optionally an antioxidant,
vii) optionally an adhesion promoter,
viii) optionally a tackifier, and
ix) optionally a wax.

\* \* \* \* \*